(12) United States Patent
Yokota et al.

(10) Patent No.: US 12,312,004 B2
(45) Date of Patent: May 27, 2025

(54) SUBFRAME FOR VEHICLE

(71) Applicants: F-TECH INC., Kuki (JP); Honda Motor Co., Ltd, Tokyo (JP)

(72) Inventors: Tomoyuki Yokota, Tochigi (JP); Toshiyuki Kawabata, Wako (JP)

(73) Assignees: F-TECH INC., Kuki (JP); Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 18/117,979

(22) Filed: Mar. 6, 2023

(65) Prior Publication Data

US 2023/0303172 A1    Sep. 28, 2023

(30) Foreign Application Priority Data

Mar. 22, 2022  (JP) .................................. 2022-44966

(51) Int. Cl.
*B62D 21/11*   (2006.01)
*B60G 7/02*    (2006.01)

(52) U.S. Cl.
CPC ................ *B62D 21/11* (2013.01); *B60G 7/02* (2013.01); *B60G 2204/15* (2013.01)

(58) Field of Classification Search
CPC .................. B60G 7/02; B60G 2206/60; B60G 2206/602; B60G 2206/604; B62D 21/11; B62D 25/08; B62D 24/155
See application file for complete search history.

(56) References Cited

U.S. PATENT DOCUMENTS

| | | | | |
|---|---|---|---|---|
| 9,744,995 B2* | 8/2017 | Tanaka | ................... | B62D 21/155 |
| 9,950,743 B2* | 4/2018 | Yokota | ................... | B62D 21/08 |
| 10,562,569 B2* | 2/2020 | Tanaka | ................... | B60K 17/16 |
| 2009/0243271 A1* | 10/2009 | Tanaka | ................... | B60G 7/02 |
| | | | | 280/124.109 |
| 2014/0339856 A1* | 11/2014 | Obata | ................... | B60G 7/02 |
| | | | | 296/193.08 |
| 2020/0307704 A1* | 10/2020 | Kawai | ................... | B62D 21/11 |

FOREIGN PATENT DOCUMENTS

| | | |
|---|---|---|
| JP | 2013-95393 A | 5/2013 |
| JP | 2015096351 A * | 5/2015 |
| JP | 2015096352 A * | 5/2015 |

OTHER PUBLICATIONS

Machine translation; JP-2015-96352-A; Automobile rear body structure (Year: 2015).*
Espace translation of JP 2015 096351 A (Year: 2015).*
Espace bibliographic data and Abstract for JP 2015 096351 A (Year: 2015).*

* cited by examiner

*Primary Examiner* — Jason D Shanske
*Assistant Examiner* — Scott Lawrence Strickler
(74) *Attorney, Agent, or Firm* — WHDA, LLP

(57) ABSTRACT

In a lower member of a subframe for a vehicle, a middle portion between an outer-side portion and an inner-side portion includes an outer-side curved bottom portion and an inner-side curved bottom portion. Adjacently-positioned closed cross-sections are provided corresponding to at least a portion of the outer-side curved bottom portion and the inner-side curved bottom portion, the adjacently-positioned closed cross-sections being made up of a first closed cross-section of a first crossmember and a second closed cross-section of the lower member positioned adjacent to each other in a vertical direction in such a manner as to be divided by a wall portion of the first crossmember and next to each other, the wall portion defining the first closed cross-section.

3 Claims, 8 Drawing Sheets

SUBFRAME FOR VEHICLE

BACKGROUND OF THE INVENTION

The present invention relates to a subframe for a vehicle, and particularly relates to a subframe for a vehicle in which the subframe supports suspension arms and other parts and is attached to a vehicle such as an automobile.

In recent years, vehicles such as automobiles are required to improve the ride comfort in addition to improving the dynamic performance. Accordingly, a subframe to be attached to the vehicle is required to set appropriate stiffness in addition to ensuring an adequate strength.

In view of the above configuration, on top of maintaining productivity, the subframe is required to have a configuration that can improve the flexibility in setting the support stiffness for suspension members, and can also avoid stress concentration on a particular region.

Under such circumstances, Japanese Patent Application Laid-open No. 2013-95393 relates to a rear vehicle-body structure of an automobile, that is designed to reduce the weight and increase the stiffness of a rear subframe, and also to improve rear collision safety, while ensuring an adequate arm length, and discloses a configuration in which a rear subframe 21 includes left and right side member portions 22 and 22 having rear portions 26 attached to left and right rear side frames 7 and 7, and having front portions 25 attached to a vehicle body crossmember 10 extending across between the left and right rear side frames 7 and 7 at inner portions of the vehicle body crossmember 10 relative to the rear side frames 7, and in which a bracket 31 that forms a support portion 29 of a front-side lower arm 33 includes a front-side panel 34 and a rear-side panel 35, each of which has an L-shaped cross-section and has a substantially triangular shape in front view, and a side panel 36 that closes an outer-side opening of the front-side panel 34 and the rear-side panel 35, thereby having a closed cross-section structure, and the bracket 31 is joined to the side member portion 22 and a crossmember portion 23 that are made of pipe material.

SUMMARY OF THE INVENTION

However, according to the studies by the present inventors, in the configuration disclosed in Japanese Patent Application Laid-open No. 2013-95393, at an inner-side end portion of the bracket 31, there is a strong tendency that a stress increases due to an input load from the lower arm and other parts during driving of a vehicle, and a notched portion is provided at this inner-side end portion to open the closed cross-section of the bracket 31. The front-side panel 34 and the rear-side panel 35 have such a simple triangular shape as to linearly decrease their area toward the inner side. Accordingly, there is an unavoidable limit to improving the flexibility in setting the support stiffness for the suspension members, while appropriately reducing the stress concentration. In this regard, it is considered that there is room for improvement in setting appropriate stiffness, while ensuring a necessary strength along with maintaining a balance between strength and stiffness.

The present invention has been made in view of the above studies, and an object of the present invention is to provide a subframe for a vehicle in which the subframe has a configuration to improve the flexibility in setting stiffness, and thus can ensure a necessary strength, while setting appropriate stiffness by optimizing the strength and the stiffness along with maintaining a balance between them.

In order to achieve the above object, a first aspect of the present invention provides a subframe for a vehicle, the subframe comprising: a first crossmember that is cylindrical and extends in a width direction of the vehicle; a second crossmember that is opposite to the first crossmember in a front-rear direction of the vehicle, and extends in the width direction; a pair of side members opposite to each other in the width direction, each of which extends in the front-rear direction and is joined to the first crossmember and the second crossmember; and a lower member that extends in the width direction on a lower side of the first crossmember in a vertical direction of the vehicle, and is joined to the first crossmember, wherein the lower member includes an outer-side portion, a middle portion, and an inner-side portion in order from an outer side toward an inner side in the width direction, the outer-side portion being provided with a lower support portion that supports a suspension member of the vehicle, the middle portion connecting to the outer-side portion, the inner-side portion connecting to the middle portion, the middle portion includes an outer-side curved bottom portion and an inner-side curved bottom portion, the outer-side curved bottom portion connecting to a bottom portion of the outer-side portion and showing a path extending upward from the bottom portion of the outer-side portion toward the inner side, while being curved without extending downward, the inner-side curved bottom portion connecting to a bottom portion of the inner-side portion and showing a path extending downward from the bottom portion of the inner-side portion toward the outer side, while being curved without extending upward, the first crossmember has a first closed cross-section in cross-section taken along a plane defined by the front-rear direction and the vertical direction, the lower member has a second closed cross-section in cross-section taken along the plane, and adjacently-positioned closed cross-sections are provided corresponding to at least a portion of the outer-side curved bottom portion and the inner-side curved bottom portion in the middle portion, the adjacently-positioned closed cross-sections being made up of the first closed cross-section and the second closed cross-section positioned adjacent to each other in the vertical direction in such a manner as to be divided by a wall portion of the first crossmember and next to each other, the wall portion defining the first closed cross-section.

According to a second aspect of the present invention, in addition to the first aspect, the adjacently-positioned closed cross-sections are always provided corresponding to at least a portion of the inner-side curved bottom portion.

According to a third aspect of the present invention, in addition to the first or second aspect, the adjacently-positioned closed cross-sections are provided continuously in the width direction across the inner-side curved bottom portion and one or both of the outer-side curved bottom portion and the bottom portion of the inner-side portion.

According to a fourth aspect of the present invention, in addition to any one of the first to third aspects, an upper support member is provided in such a manner as to be joined to the first crossmember, the upper support member being opposite to the lower member on an upper side in the vertical direction with the first crossmember interposed therebetween, the upper support member including an upper-side support portion that supports a suspension member of the vehicle, the upper support member being joined to an inclined surface portion that is inclined by recessing a portion of a cylindrical wall of the first crossmember.

According to a fifth aspect of the present invention, in addition to any one of the first to fourth aspects, each of the pair of side members includes a pair of side walls, a top wall, and a bottom wall, the pair of side walls being opposite to each other in the width direction, the top wall connecting upper-side end portions of the pair of side walls in the vertical direction, the bottom wall being opposite to the top wall on the lower side and connecting lower-side end portions of the pair of side walls in the vertical direction, the top wall includes a recessed portion and a pair of convex-shaped portions in a front-side portion of the top wall in the front-rear direction, the recessed portion being recessed toward the lower side at a middle portion of the top wall in the width direction, the pair of convex-shaped portions protruding toward the upper side relative to the recessed portion at opposite end portions of the top wall in the width direction, on the top wall, a front end portion of the recessed portion is joined to the first crossmember, the bottom wall includes a recessed portion and a pair of convex-shaped portions in the front-side portion of the bottom wall, the recessed portion being recessed toward the upper side at a middle portion of the bottom wall in the width direction, the pair of convex-shaped portions protruding toward the lower side relative to the recessed portion at opposite end portions of the bottom wall in the width direction, and on the bottom wall, a front end portion of the recessed portion is joined to the first crossmember.

In the configuration according to the first aspect of the present invention, a lower member includes an outer-side portion, a middle portion, and an inner-side portion in order from an outer side toward an inner side in a width direction, the outer-side portion being provided with a lower support portion that supports a suspension member of a vehicle, the middle portion connecting to the outer-side portion, the inner-side portion connecting to the middle portion, the middle portion includes an outer-side curved bottom portion and an inner-side curved bottom portion, the outer-side curved bottom portion connecting to a bottom portion of the outer-side portion and showing a path extending upward from the bottom portion of the outer-side portion toward the inner side, while being curved without extending downward, the inner-side curved bottom portion connecting to a bottom portion of the inner-side portion and showing a path extending downward from the bottom portion of the inner-side portion toward the outer side, while being curved without extending upward, a first crossmember has a first closed cross-section in cross-section taken along a plane defined by a front-rear direction and a vertical direction, the lower member has a second closed cross-section in cross-section taken along the plane, and adjacently-positioned closed cross-sections are provided corresponding to at least a portion of the outer-side curved bottom portion and the inner-side curved bottom portion in the middle portion, the adjacently-positioned closed cross-sections being made up of the first closed cross-section and the second closed cross-section positioned adjacent to each other in the vertical direction in such a manner as to be divided by a wall portion of the first crossmember and next to each other, the wall portion defining the first closed cross-section. With this configuration, while a necessary strength of the subframe for a vehicle is ensured, the flexibility in setting support stiffness for the suspension member can be improved, so that the strength and the stiffness can be optimized while maintaining a balance between them. Therefore, desired stiffness can be set, and a required strength can be ensured.

In the configuration according to the second aspect of the present invention, the adjacently-positioned closed cross-sections are always provided corresponding to at least a portion of the inner-side curved bottom portion. With this configuration, in a minimum range of adjacently-positioned vertical cross-sections in the width direction, appropriate support stiffness for the suspension member can be set, while a necessary strength of the subframe for a vehicle is ensured.

In the configuration according to the third aspect of the present invention, the adjacently-positioned closed cross-sections are provided continuously in the width direction across the inner-side curved bottom portion and one or both of the outer-side curved bottom portion and the bottom portion of the inner-side portion. With this configuration, stress concentration on the subframe for a vehicle can be reduced to eliminate a particular weak section, so that the strength of the subframe for a vehicle can be further increased.

In the configuration according to the fourth aspect of the present invention, an upper support member is provided in such a manner as to be joined to the first crossmember, the upper support member being opposite to the lower member on an upper side in the vertical direction with the first crossmember interposed therebetween, the upper support member including an upper-side support portion that supports a suspension member of the vehicle, the upper support member being joined to an inclined surface portion that is inclined by recessing a portion of a cylindrical wall of the first crossmember. With this configuration, the upper support member and the inclined surface portion can be joined to each other in a state in which the upper support member is brought into close contact with the inclined surface portion, so that this can reduce the likelihood of occurrence of separation fracture in the joined portion.

In the configuration according to the fifth aspect of the present invention, each of a pair of side members includes a pair of side walls, a top wall, and a bottom wall, the pair of side walls being opposite to each other in the width direction, the top wall connecting upper-side end portions of the pair of side walls in the vertical direction, the bottom wall being opposite to the top wall on a lower side and connecting lower-side end portions of the pair of side walls in the vertical direction, the top wall includes a recessed portion and a pair of convex-shaped portions in a front-side portion of the top wall in the front-rear direction, the recessed portion being recessed toward the lower side at a middle portion of the top wall in the width direction, the pair of convex-shaped portions protruding toward the upper side relative to the recessed portion at opposite end portions of the top wall in the width direction, on the top wall, a front end portion of the recessed portion is joined to the first crossmember, the bottom wall includes a recessed portion and a pair of convex-shaped portions in the front-side portion of the bottom wall, the recessed portion being recessed toward the upper side at a middle portion of the bottom wall in the width direction, the pair of convex-shaped portions protruding toward the lower side relative to the recessed portion at opposite end portions of the bottom wall in the width direction, and on the bottom wall, a front end portion of the recessed portion is joined to the first crossmember. With this configuration, while the throwing power of coating on the pair of side members is improved, their adequate welding length can be ensured to increase the welding strength.

DETAILED DESCRIPTION OF THE PREFERRED EMBODIMENT

Figure 1:
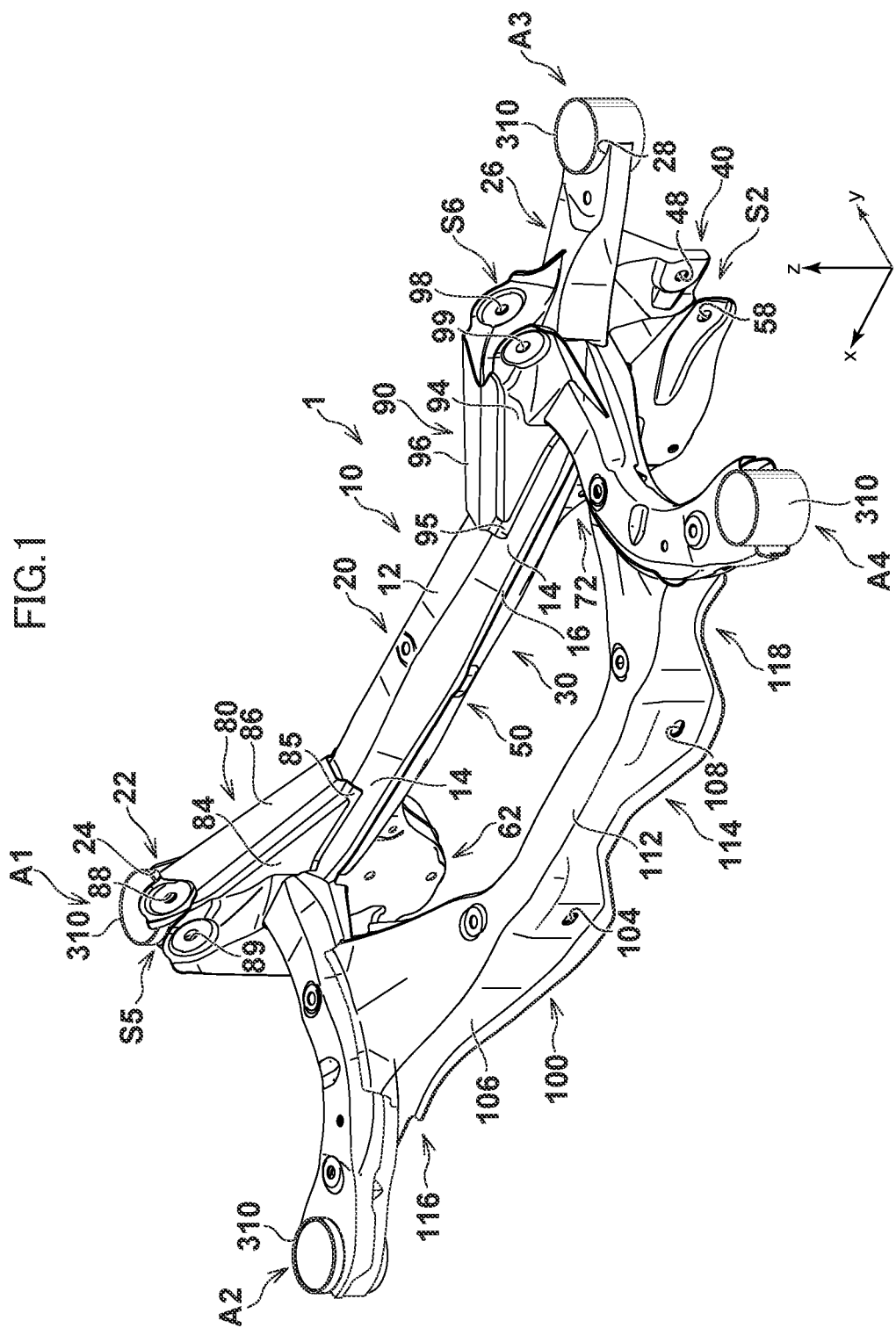
FIG. 1 is a perspective view of a subframe for a vehicle according to an embodiment of the present invention.

A subframe for a vehicle according to an embodiment of the present invention is described below in detail with reference to FIGS. 1 to 9 as appropriate. In the drawings, an x-axis, a y-axis, and a z-axis form a triaxial orthogonal coordinate system. The positive direction of the x-axis is a left direction of a vehicle body, the positive direction of the y-axis is a front direction of the vehicle body, and the positive direction of the z-axis is an upper direction of the vehicle body. x-axis directions are referred to as a width direction, y-axis directions are referred to as a front-rear direction, and z-axis directions are referred to as a vertical direction in some cases. An x-y plane is referred to as a horizontal plane in some cases.

Figure 2:
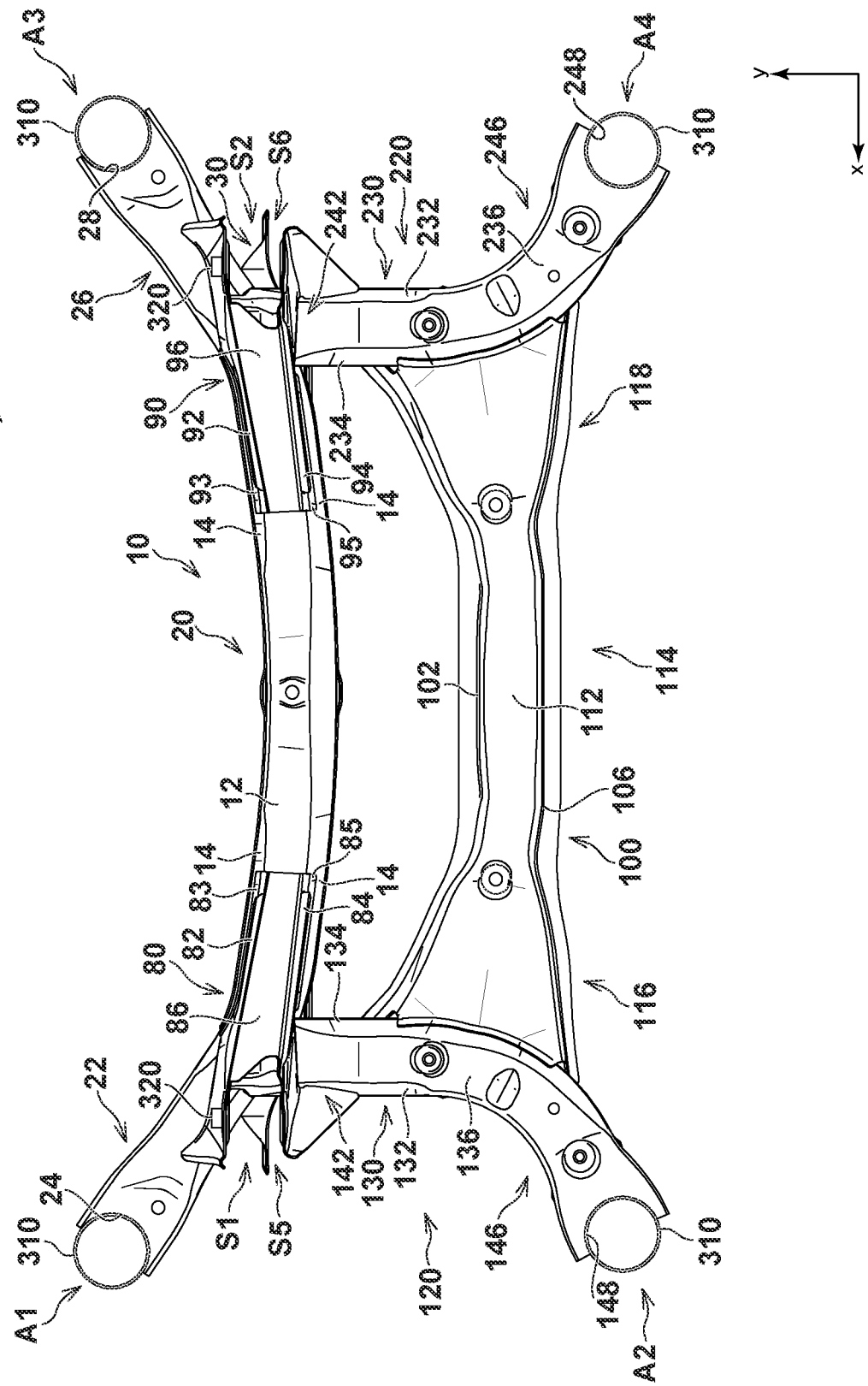
FIG. 2 is a plan view of the subframe for a vehicle according to the present embodiment.
Figure 3:
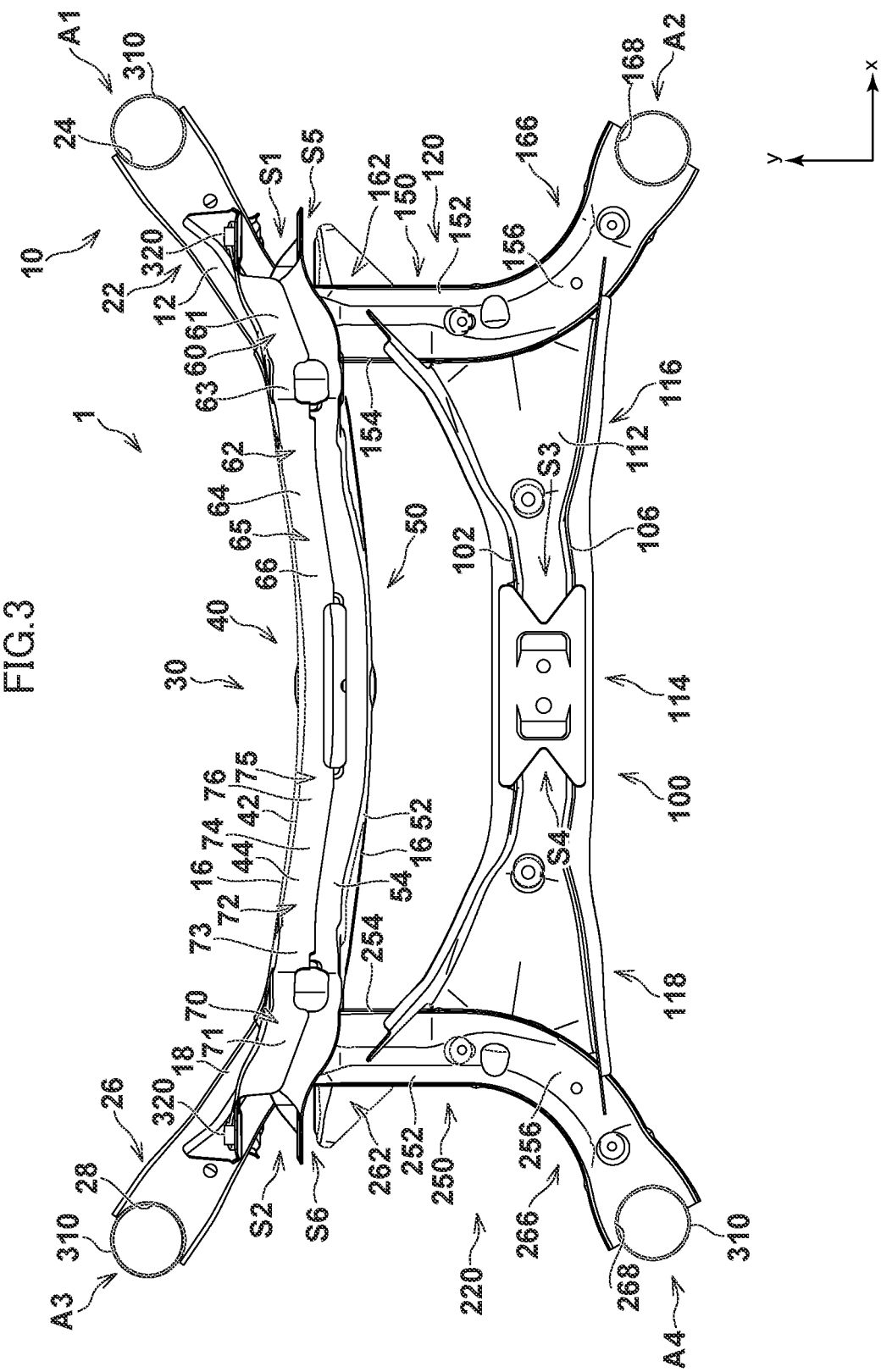
FIG. 3 is a bottom view of the subframe for a vehicle according to the present embodiment.
Figure 4:
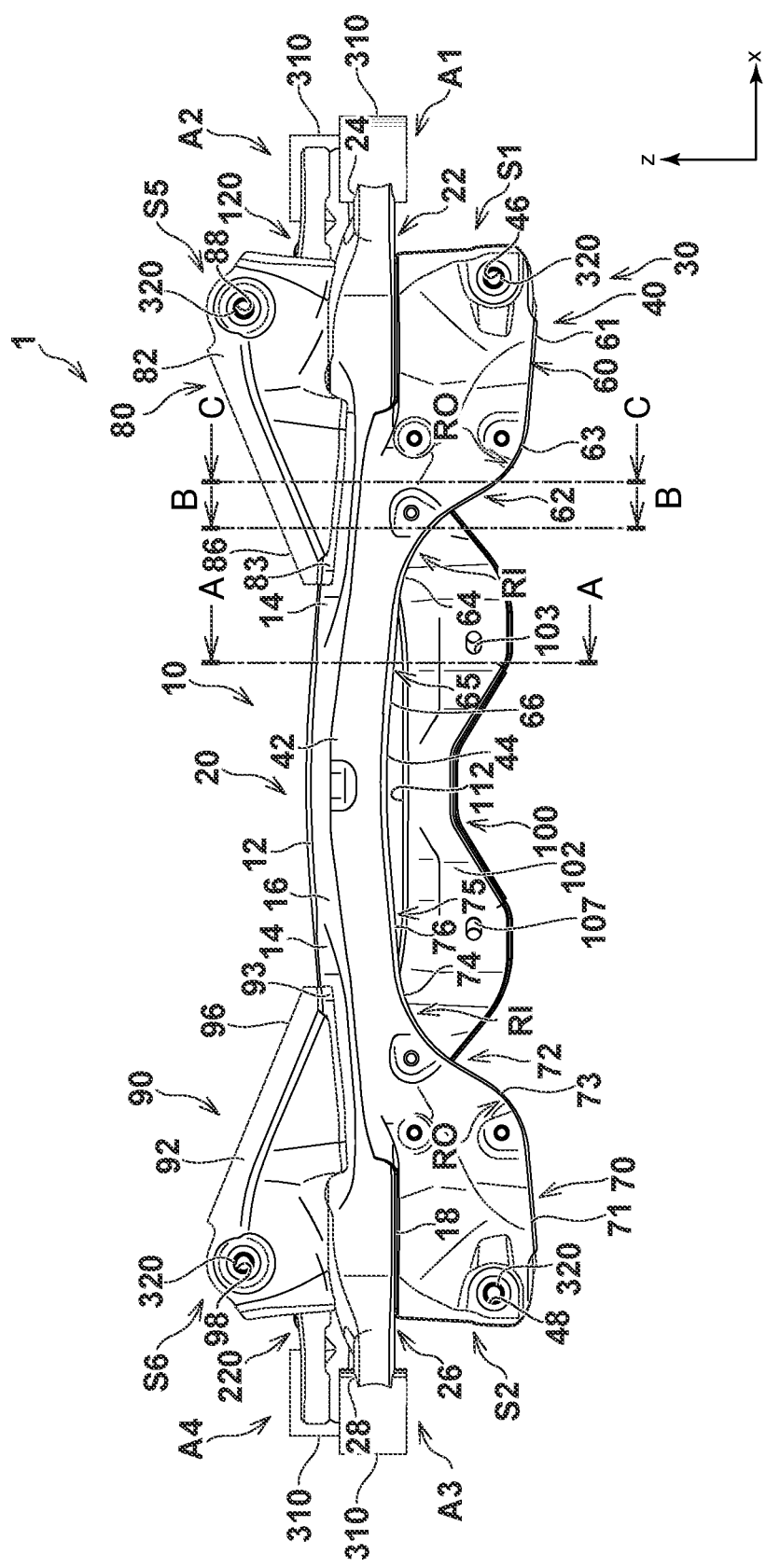
FIG. 4 is a front view of the subframe for a vehicle according to the present embodiment.
Figure 5:
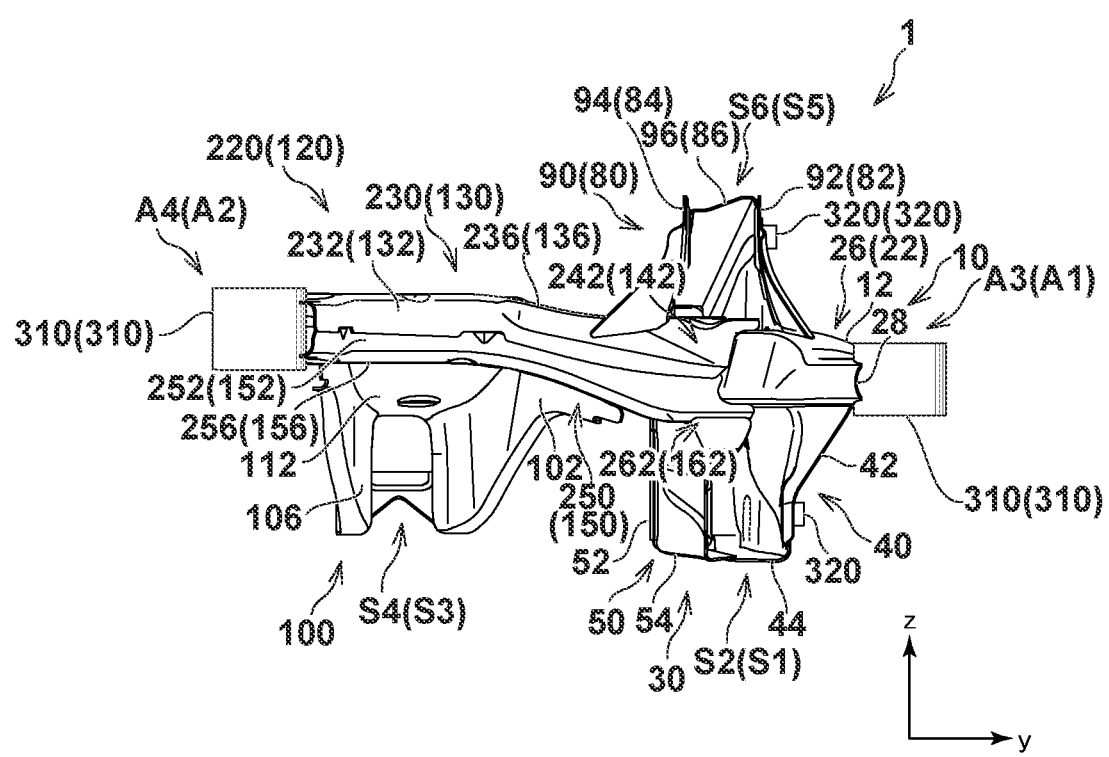
FIG. 5 is a right side view of the subframe for a vehicle according to the present embodiment.
Figure 6A:
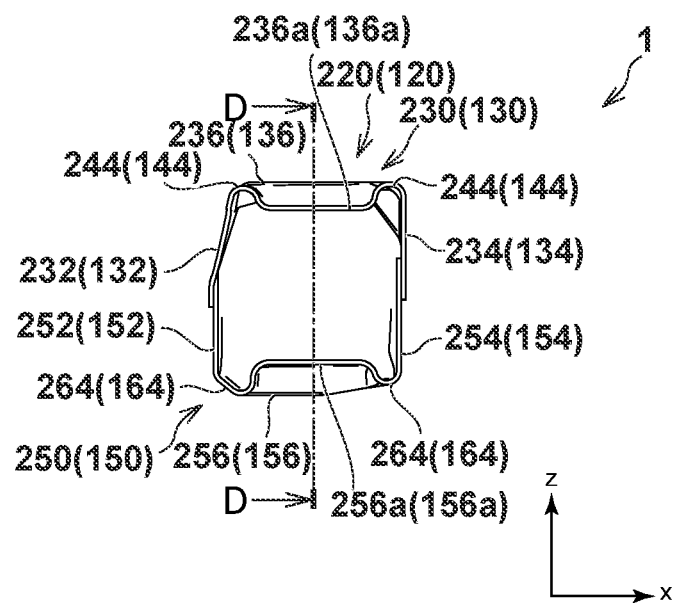
FIG. 6A is a front view illustrating a front portion of a right side frame of the subframe for a vehicle according to the present embodiment and FIG. 6B is a cross-sectional view taken along the D-D line of FIG. 6A.
Figure 6B:
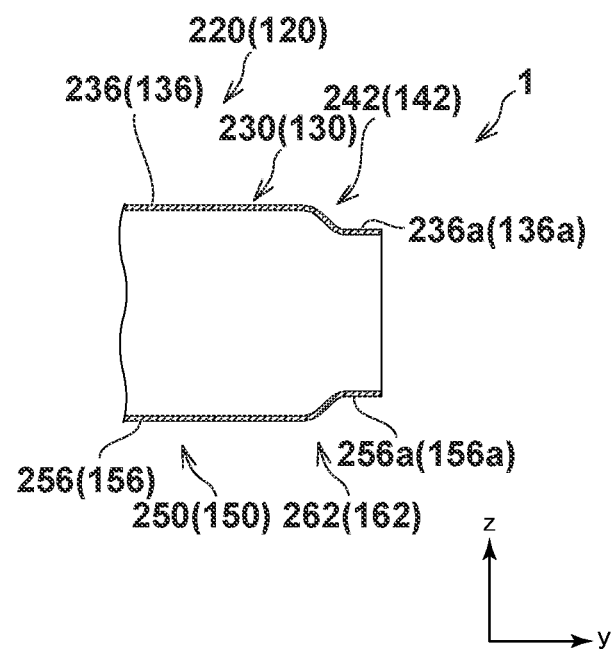
Figure 7:
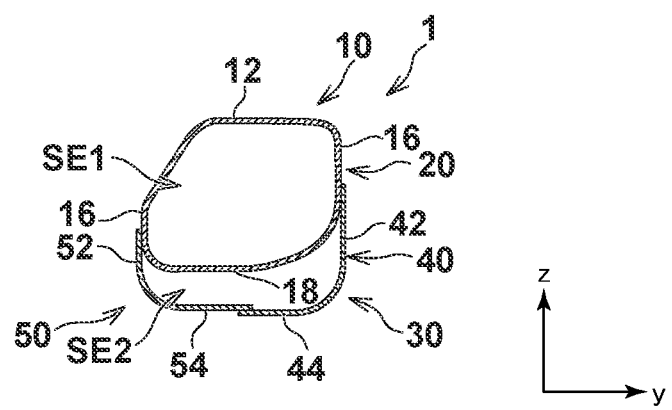
FIG. 7 is a cross-sectional view taken along the A-A line of FIG. 4.
Figure 8:
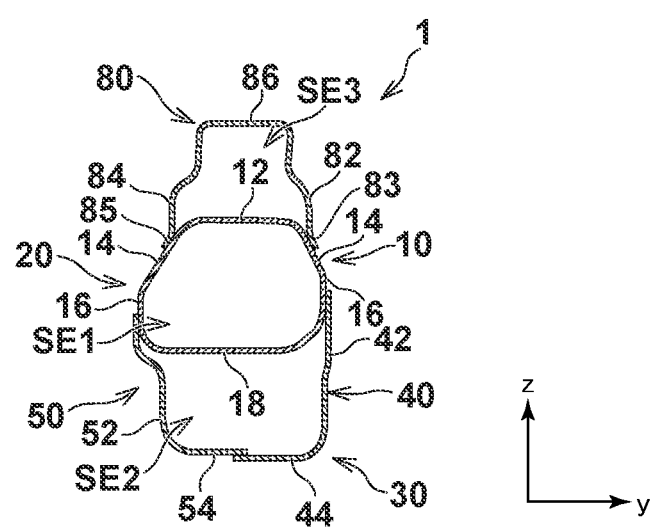
FIG. 8 is a cross-sectional view taken along the B-B line of FIG. 4.
Figure 9:
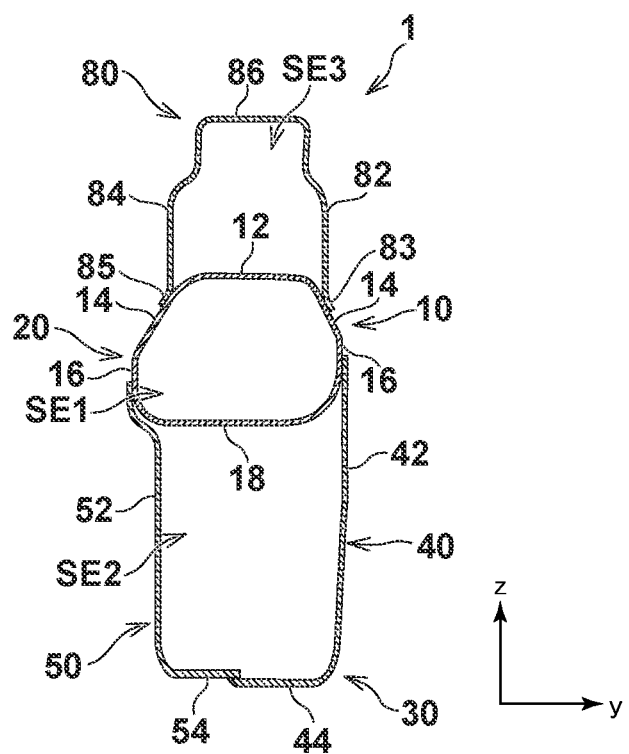
FIG. 9 is a cross-sectional view taken along the C-C line of FIG. 4.

FIG. 1 is a perspective view of the subframe for a vehicle according to the present embodiment. FIG. 2 is a plan view of the subframe for a vehicle according to the present embodiment. FIG. 3 is a bottom view of the subframe for a vehicle according to the present embodiment. FIG. 4 is a front view of the subframe for a vehicle according to the present embodiment. FIG. 5 is a right side view of the subframe for a vehicle according to the present embodiment. FIG. 6A is a front view illustrating a front portion of a right side frame of the subframe for a vehicle according to the present embodiment. FIG. 6B is a cross-sectional view taken along the D-D line of FIG. 6A. FIG. 7 is a cross-sectional view taken along the A-A line of FIG. 4. FIG. 8 is a cross-sectional view taken along the B-B line of FIG. 4. FIG. 9 is a cross-sectional view taken along the C-C line of FIG. 4. For convenience of explanation, in FIGS. 5, 6A, and 6B, some of the left-side constituent elements of the subframe for a vehicle are denoted by reference signs in parentheses along with the reference signs for the right-side constituent elements as needed.

As illustrated in FIGS. 1 to 9, a subframe 1 according to the present embodiment supports suspension arms while being attached to a vehicle body such as a rear side frame of a vehicle such as an automobile, although illustrations thereof are omitted. Typically and basically, the subframe 1 has a laterally symmetrical (plane-symmetrical) shape with respect to the plane parallel to a y-z plane and passing along the center in the width direction of the vehicle body.

Specifically, the subframe 1 has a parallel crossbeam shape in plan view, and includes, as its main framework elements, a front crossmember 10, a rear crossmember 100, a left side member 120, and a right side member 220. The front crossmember 10 is made up of a cylindrical tubular member extending in the width direction. The rear crossmember 100 is located rearward relative to and opposite to the front crossmember 10, and extends in the width direction. The left side member 120 and the right side member 220 extend in the front-rear direction opposite to each other in the width direction. Each of the left side member 120 and the right side member 220 is joined to the front crossmember 10 and the rear crossmember 100. These framework elements are welded correspondingly to each other into one piece typically by arc welding. It is allowable that the orientation of the subframe 1 in the front-rear direction may be reversed according to the type or other factor of the vehicle to which the subframe 1 is applied.

Typically, the front crossmember 10 is made of a steel pipe having a cylindrical shape. A circumferential wall 12 of the cylindrical shape is partially recessed from its original shape by hydraulic forming or other molding process to become flattened, so that the front crossmember 10 includes flat portions such as an inclined flat portion 14 that is inclined to the x-z plane and a flat portion 16 that is parallel to the x-z plane. The front crossmember 10 may include a flat portion parallel to the x-y plane with a top portion or a bottom portion of the circumferential wall 12 partially flattened. The front crossmember 10 may be made up of a plurality of members, each of which is obtained by press-forming a flat-plate member such as a steel plate.

Specifically, the front crossmember 10 includes a main body portion 20, a left extending portion 22, and a right extending portion 26. The main body portion 20 has a curved shape that is convex toward the rear side in plan view and extends in the width direction. The left extending portion 22 extends from a left end portion of the main body portion 20 in the width direction, while curving toward the left-front direction with a curvature greater than the curvature of the main body portion 20. The right extending portion 26 extends from a right end portion of the main body portion 20 in the width direction, while curving toward the right-front direction with a curvature greater than the curvature of the main body portion 20. The left end portion of the left extending portion 22 forms a left notched portion 24 that is notched into a substantially arc shape. A collar member 310 is welded to the left notched portion 24 by arc welding or other welding process. Similarly to the left extending portion 22, the right end portion of the right extending portion 26 forms a right notched portion 28 that is notched into a substantially arc shape. Another collar member 310 is welded to the right notched portion 28 by arc welding or other welding process.

In the front crossmember 10, the left notched portion 24 and the right notched portion 28 are opening end portions of the main body portion 20, the left extending portion 22, and the right extending portion 26. The interior of the main body portion 20, the left extending portion 22, and the right extending portion 26 is open to the exterior through these opening end portions, however, the main body portion 20, the left extending portion 22, and the right extending portion 26 form a closed cross-section SE1 in vertical cross-section taken along the plane parallel to the y-z plane.

In the front crossmember 10, the reasons for setting the curvature of the left extending portion 22 and the curvature of the right extending portion 26 greater than the curvature of the main body portion 20 are as follows. The layout space on the front side of the main body portion 20 is increased, while adequate stiffness of the main body portion 20 in the width direction is ensured. In addition, the left end portion of the left extending portion 22 and the right end portion of the right extending portion 26 are positioned more forward, so that the collar members 310 and 310 that are correspondingly welded to the left notched portion 24 and the right notched portion 28 to serve as a front-side vehicle-body mounting portion are positioned more forward and away from a rear-side vehicle-body mounting portion, thereby to increase the span between the front-side and rear-side vehicle-body mounting portions.

In the front crossmember 10, subframe mount members (not illustrated) with a necessary capacity are attached to the collar members 310 and 310. On the assumption that it is possible to weld the collar members 310 and 310 correspondingly to the left notched portion 24 and the right notched portion 28 with a required welding strength, and it is also possible to ensure a required strength and stiffness of the left extending portion 22 and the right extending portion 26, and from the viewpoint of increasing the flexibility in layout of the left extending portion 22 and the right extending portion 26 in a vertical direction, the length of the left extending portion 22 and the right extending portion 26 in the vertical direction is set smaller than that of the main body portion 20, and accordingly the left extending portion 22 and the right extending portion 26 become flattened.

The front crossmember 10 includes a lower member 30 that extends in the width direction on the lower side of the front crossmember 10 and that is joined to the front crossmember 10. The lower member 30 may be joined to the left side member 120 and the right side member 220 at opposite end portions of the lower member 30 in the width direction by using only a portion protruding rearward from the front crossmember 10.

The lower member 30 includes a first member 40 and a second member 50, each of which is typically obtained by press-forming a flat-plate member such as a steel plate, and has a substantially L-shape in vertical cross-section taken along the plane parallel to the y-z plane. The lower member 30 may be formed using a single plate member as necessary, instead of using two plate members that are the first member 40 and the second member 50.

The first member 40 includes a front vertical wall 42 and a front bottom wall 44. The front vertical wall 42 closes the front side of the lower member 30, and extends in the width direction, while being provided in a standing manner in the vertical direction. The front bottom wall 44 is bent rearward parallel to the horizontal plane at a lower end portion of the front vertical wall 42, and extends in the width direction while protruding rearward from the lower end portion. At a left end portion of the front vertical wall 42, a left-front through hole 46 is formed, penetrating the front vertical wall 42. At a right end portion of the front vertical wall 42, a right-front through hole 48 is formed, penetrating the front vertical wall 42. Nut members 320 and 320 are welded to the left-front through hole 46 and the right-front through hole 48 in such a manner that each of the nut members 320 and 320 stands directed toward the front direction from the front surface of the front vertical wall 42.

The second member 50 has a basic configuration in which the first member 40 is inverted front side back, and includes a rear vertical wall 52 and a rear bottom wall 54. The rear vertical wall 52 closes the rear side of the lower member 30, and extends in the width direction, while being provided in a standing manner in the vertical direction. The rear bottom wall 54 is bent forward parallel to the horizontal plane at a lower end portion of the rear vertical wall 52, and extends in the width direction while protruding forward from the lower end portion. At a left end portion of the rear vertical wall 52, a left-rear through hole 56 is formed, penetrating the rear vertical wall 52. At a right end portion of the rear vertical wall 52, a right-rear through hole 58 is formed, penetrating the rear vertical wall 52. The left-rear through hole 56 and the right-rear through hole 58 are located rearward relative to and opposite to the left-front through hole 46 and the right-front through hole 48, respectively.

Specifically, the lower member 30 includes, in the order from the left outer side toward the inner side, a left outer-side portion 60, a left middle portion 62, and a left inner-side portion 65. The left outer-side portion 60 is provided with the nut member 320, the left-front through hole 46, and the left-rear through hole 56, all of which are located in a left-front lower support portion that supports the suspension arm of a vehicle such as a lower arm. The left middle portion 62 connects to the left outer-side portion 60 on its right side. The left inner-side portion 65 connects to the left middle portion 62 on its right side closer to the center in the width direction. The left middle portion 62 includes a left outer curved bottom portion 63 and a left inner curved bottom portion 64. The left outer curved bottom portion 63 connects to a left outer bottom portion 61, that is, the front bottom wall 44 and the rear bottom wall 54, in the left outer-side portion 60, and has a curved shape showing a path directed toward the inner side without extending downward from the left outer bottom portion 61, and extending upward while increasing the gradient of the tangent (the angle relative to the horizontal plane) toward the inner side, the curved shape also being convex toward the obliquely right lower side. The left inner curved bottom portion 64 is connected to a left inner bottom portion 66, that is, the front bottom wall 44 and the rear bottom wall 54, in the left inner-side portion 65, and has a curved shape showing a path directed toward the outer side without extending upward from the left inner bottom portion 66, and extending downward while increasing the gradient of the tangent (the angle relative to the horizontal plane) toward the outer side, the curved shape also being convex toward the obliquely left upper side. The left outer curved bottom portion 63 and the left inner curved bottom portion 64 are provided, so that as their respective curvatures (radii of curvature RO and RI) are changed in the design process, it is possible to change the stiffness to an input load mainly in the width direction to be applied from the suspension arm. Consequently, on the assumption that a required strength of the lower member 30, therefore, the subframe 1 is ensured, it is possible to set desired support stiffness for the suspension arm, in other words, to set such a shape of the left outer curved bottom portion 63 and the left inner curved bottom portion 64 as to provide the desired support stiffness with an increased flexibility. On the assumption that it is possible to ensure a required strength and desired stiffness, a flat-shaped bottom portion that is not curved may be interposed between the left outer curved bottom portion 63 and the left inner curved bottom portion 64. Each of the curvatures of the left outer curved bottom portion 63 and the left inner curved bottom portion 64 (radii of curvature RO and RI) is not limited to being made up of a single curvature (a radius of curvature RO or RI), but may be multiple curvatures made up of a plurality of curvatures (radii of curvature RO, RO' . . . , and RI, RI' . . . ) as necessary.

Relative to the configuration related to the left outer-side portion 60, the left middle portion 62, and the left inner-side portion 65, a configuration related to a right outer-side portion 70, a right middle portion 72, and a right inner-side portion 75 that are located in the order from the right outer side of the lower member 30 toward the inner side is laterally symmetrical with respect to the plane parallel to the y-z plane and passing along the center of the vehicle body in the width direction. Accordingly, the detailed descriptions of this configuration are omitted. The right outer-side portion 70, a right outer bottom portion 71, the right middle portion 72, a right outer curved bottom portion 73, a right inner curved bottom portion 74, the right inner-side portion 75, and a right inner bottom portion 76 are provided corresponding to the left outer-side portion 60, the left outer bottom portion 61, the left middle portion 62, the left outer curved bottom portion 63, the left inner curved bottom portion 64, the left inner-side portion 65, and the left inner bottom portion 66, respectively. On the assumption that it is possible to ensure a required strength and desired stiffness, the lower member 30 may be divided into left and right sections without extending continuously in the width direction in the central region of the subframe 1 in the width direction and a region adjacent to the central region, typically, the left inner-side portion 65, the right inner-side portion 75, and a section between them in the width direction.

In the lower member 30, at the left inner-side portion 65, the right inner-side portion 75, a section between them in the width direction, the left middle portion 62, and the right middle portion 72, the upper end portion of the front vertical wall 42 is welded on its inner surface to the outer surface of the flat portion 16 on the front side of the front crossmember 10 by arc welding or other welding process, while being brought into contact with the outer surface of the flat portion 16, so that the first member 40 is joined to the front crossmember 10 to be formed integrally. In addition, the upper end portion of the rear vertical wall 52 is welded on its inner surface to the outer surface of the flat portion 16 on the rear side of the front crossmember 10 by arc welding or other welding process, while being brought into contact with the outer surface of the flat portion 16, so that the second member 50 is joined to the front crossmember 10 to be formed integrally. With this configuration, an input load on the lower member 30 and an input load on the left support member 80 or the right support member 90 are applied in the same direction in the width direction. This reduces the likelihood of occurrence of separation fracture in a welded portion between the front crossmember 10 and the lower member 30 even under the condition that an increased shear stress is applied to the welded portion described above, and thus makes it possible to ensure a required welding strength. The rear end portion of the front bottom wall 44 and the front end portion of the rear vertical wall 52 are welded together over the entire length in the width direction by arc welding or other welding process along their boundary portion defined by overlapping these rear end portion and front end portion one another, so that the first member 40 and the second member 50 are joined together into one piece as the lower member 30. In each of the left outer-side portion 60 and the right outer-side portion 70, a flange portion that is bent forward and parallel to the horizontal plane is provided at the upper end portion of the front vertical wall 42, and a flange portion that is bent rearward and parallel to the horizontal plane is also provided at the upper end portion of the rear vertical wall 52. While the top surface of these flange portions is brought into contact with the outer surface of the bottom flat portion 18 of the front crossmember 10, the top surface of these flange portions is welded to the outer surface of the bottom flat portion 18 by arc welding or other welding process. Similarly to the flat portion 16 and other portions, the bottom flat portion 18 is formed parallel to the x-y plane with the bottom portion of the circumferential wall 12 of the front crossmember 10 being partially recessed from its original shape by hydraulic forming or other forming process to become flattened. It suffices that the welded portions in the left outer-side portion 60 and the right outer-side portion 70 are intended to be supplemental, having a smaller welding length and a shorter front-rear span than those of the welded portions in the left inner-side portion 65, the right inner-side portion 75, a section between them in the width direction, the left middle portion 62, and the right middle portion 72.

That is, in the front crossmember 10 and the lower member 30, their end portions brought into contact with each other are welded and joined together into one piece, so that the circumferential wall 12 of the front crossmember 10 cooperates with the front vertical wall 42, the front bottom wall 44, the rear vertical wall 52, and the rear bottom wall 54 of the lower member 30, thereby forming a closed cross-section SE2 in vertical cross-section taken along the plane parallel to the y-z plane. The closed cross-section SE2 is defined in at least the left middle portion 62 and the right middle portion 72 by welding the upper end portions of the front vertical wall 42 and the rear vertical wall 52 on their inner surface to the outer surface of the flat portion 16 of the front crossmember 10, while being brought into contact with the outer surface of the flat portion 16. Therefore, this makes it possible to have a greater length in the front-rear direction and ensure a larger cross-sectional area. The closed cross-section SE2 is next to the lower side of the closed cross-section SE1 of the front crossmember 10 through the circumferential wall 12, so that the closed cross-section SE1 and the closed cross-section SE2 form a cross-section of two stacked layers positioned next to each other in the vertical direction. From the viewpoint that the closed cross-section SE2 and the closed cross-section SE1 cooperate with each other to increase the strength of the subframe 1 and increase the support stiffness for the suspension arm, it is preferable that the closed cross-section SE2, that is, the closed cross-section SE1 and the closed cross-section SE2 positioned adjacent to each other are located in at least a portion of the left middle portion 62 and a portion of the right middle portion 72 on which a stress tends to concentrate due to an input load or the like applied from the suspension arm. A section of the left middle portion 62 closer to the left inner-side portion 65, and a section of the right middle portion 72 closer to the right inner-side portion 75 are most likely to receive stress concentration. For this reason, it is preferable that the closed cross-section SE2, that is, the closed cross-section SE1 and the closed cross-section SE2 positioned adjacent to each other are located at a position corresponding to at least a portion of the left inner curved bottom portion 64 and a portion of the right inner curved bottom portion 74. Furthermore, from the viewpoint of further reducing the stress concentration due to the input load or the like applied from the suspension arm, the closed cross-section SE2, that is, the closed cross-section SE1 and the closed cross-section SE2 positioned adjacent to each other are located continuously in the width direction across the left inner curved bottom portion 64 and the right inner curved bottom portion 74, and their corresponding left inner bottom portion 66 and right inner bottom portion 76. Similarly to the above configuration, from the viewpoint of further reducing the stress concentration due to the input load or the like applied from the suspension arm, the closed cross-section SE2, that is, the closed cross-section SE1 and the closed cross-section SE2 positioned adjacent to each other are located continuously in the width direction across the left inner curved bottom portion 64 and the right inner curved bottom portion 74, and their corresponding left outer curved bottom portion 63 and right outer curved bottom portion 73. That is, it is basically impossible to place a hole such as a water drain hole or a coating drain hole in such a section of the lower member 30 that the closed cross-section SE2 is located. However, when, depending on the specifications and other factors of the subframe 1, the degree of stress concentration is low on the left outer curved bottom portion 63, the right outer curved bottom portion 73, the left inner bottom portion 66, and the right inner bottom portion 76, as well as on a section between the left inner bottom portion 66 and the right inner bottom portion 76 in the width direction, it is possible to provide the hole, provided that it is possible to ensure a required strength and stiffness. Similarly to the above configuration, when the left outer-side portion 60 and the right outer-side portion 70 have a sufficient strength, it is still possible for the left outer bottom portion 61 and the right outer-side portion 70 to be provided with a hole or an opening. The size of the closed cross-section SE2, particularly its length in the vertical direction, is increased from the inner-side portion closer to the center toward the left and right outer-side portions, especially at the left middle portion 62 and the right middle portion 72 in association with positioning of the left lower support portion and the right lower support portion, each of which supports the suspension arm.

The front crossmember 10 includes the left support member 80 and the right support member 90 that extend in the width direction on the side of opposite end portions of the upper side of the front crossmember 10 in its width direction, and that are joined to the front crossmember 10. The left support member 80 and the right support member 90 may be joined at opposite end portions in their width direction to the left side member 120 and the right side member 220 respectively by using only a portion protruding from the front crossmember 10.

Typically, the left support member 80 has a substantially hat-like shape in vertical cross-section that is opened downward and obtained by press-forming a flat-plate member such as a steel plate. The left support member 80 includes a front vertical wall 82, a rear vertical wall 84, and a top wall 86. The front vertical wall 82 includes a left-front through hole 88 penetrating the left end portion of the left support member 80 in the front-rear direction. The rear vertical wall 84 is located rearward relative to and opposite to the front vertical wall 82, and includes a left-rear through hole 89 penetrating the left end portion of the left support member 80 in the front-rear direction and located rearward relative to and opposite to the left-front through hole 88 on the front vertical wall 82. The top wall 86 connects the front vertical wall 82 and the rear vertical wall 84. The nut member 320 is welded to the left-front through hole 88.

The left support member 80 includes a front flange 83 that extends forward from the lower end portion of the front vertical wall 82, and a rear flange 85 that extends rearward from the lower end portion of the rear vertical wall 84. The respective end portions of the front flange 83 and the rear flange 85 are welded on their inner surface to the outer surface of the inclined flat portion 14 of the front crossmember 10 and to the outer surface of a top wall 136 and other portions of a left upper member 130 of the left side member 120 typically by arc welding and are joined together, while their inner surface is brought into contact with these outer surfaces. With this configuration, an input load on the lower member 30 and an input load on the left support member 80 or the right support member 90 are applied in the same direction in the width direction. This reduces the likelihood of occurrence of separation fracture in welded portions between the front crossmember 10 and the left support member 80 even under the condition that an increased shear stress is applied to the welded portions described above, and thus makes it possible to ensure a required welding strength.

In the front crossmember 10 and the left support member 80, their end portions brought into contact with each other are welded and joined together into one piece, so that the circumferential wall 12 of the front crossmember 10 cooperates with the front vertical wall 82, the rear vertical wall 84, and the top wall 86 of the left support member 80, thereby forming a closed cross-section SE3 in vertical cross-section taken along the plane parallel to the y-z plane. From the viewpoint of increasing the strength of the subframe 1 and increasing the support stiffness for the suspension arm, it is preferable for the closed cross-section SE3 to have a portion opposite to the closed cross-section SE2 of the lower member 30 in the vertical direction with the closed cross-section SE1 of the front crossmember 10 interposed therebetween.

Since the configuration related to the right support member 90 is laterally symmetrical to the configuration related to the left support member 80, detailed descriptions thereof are omitted. A front vertical wall 92, a front flange 93, a rear vertical wall 94, a rear flange 95, a top wall 96, a right-front through hole 98, a right-rear through hole 99, and the closed cross-section SE3 are provided corresponding to the front vertical wall 82, the front flange 83, the rear vertical wall 84, the rear flange 85, the top wall 86, the left-front through hole 88, the left-rear through hole 89, and the closed cross-section SE3, respectively.

Typically, the rear crossmember 100 has a substantially hat-like shape in vertical cross-section that is opened downward and obtained by press-forming a flat-plate member such as a steel plate. The rear crossmember 100 includes a left-front through hole 103 and a right-front through hole 107 that penetrate the left end portion and the right end portion of the front vertical wall 102 correspondingly in the front-rear direction, and further includes a left-rear through hole 104 and a right-rear through hole 108 that penetrate the left end portion and the right end portion of the rear vertical wall 106 correspondingly in the front-rear direction, and that are located rearward relative to and opposite correspondingly to the left-front through hole 103 and the right-front through hole 107 on the front vertical wall 102. The front vertical wall 102 and the rear vertical wall 106 are connected through the top wall 112. Guide members may be attached to the left-front through hole 103, the right-front through hole 107, the left-rear through hole 104, and the right-rear through hole 108 to guide the suspension arm such as a lower arm, although illustrations thereof are omitted.

The rear crossmember 100 includes a left widening portion 116 and a right widening portion 118 whose length in the front-rear direction gradually increases from a main body portion 114 that is a central portion of the rear crossmember 100 in its width direction toward the left outer side and the right outer side. A left end portion of the left widening portion 116 and a right end portion of the right widening portion 118 are notched to serve as a notched portion, and are welded and joined to the left side member 120 and the right side member 220 typically by arc welding. The front end of the left end portion of the left widening portion 116 and the front end of the right end portion of the right widening portion 118 are positioned at a section deviated forward with a larger deviation length compared to that of the respective rear ends, and closer toward a front end surface of recessed portions 136a and 156a of the left side member 120 and a front end surface of recessed portions 236a and 256a of the right side member 220. The left side member 120 and the right side member 220 are described later. With this configuration, it is possible for the rear crossmember 100 to have a greater welding length to the left side member 120 and the right side member 220, and it is also possible for the rear crossmember 100 to be joined to the left side member 120 and the right side member 220 closer to the front crossmember 10 and the lower member 30 that have a greater strength and stiffness.

Typically, the left side member 120 includes the left upper member 130 and a left lower member 150 opposite to each other in the vertical direction, each of which is obtained by press-forming a flat-plate member such as a steel plate, and each of which has a substantially U-shape in vertical cross-section. The left side member 120 has a curved shape that is convex rightward in plan view. The left side member 120 may be made up of a pipe member such as a steel pipe.

The left upper member 130 includes an outer wall 132 and an inner wall 134 that are opposite to each other in the width direction and extend in the front-rear direction, and the top wall 136 that connects the outer wall 132 and the inner wall 134. The left upper member 130 further includes, at a front portion 142 of the top wall 136, the recessed portion 136a that is recessed downward at the middle portion of the top wall 136 in the width direction (the central portion in the width direction and a portion on the left and right side of the central portion). The left upper member 130 also includes a rear notched portion 148 that is notched into a substantially arc shape at the rear end portion of the top wall 136. In the front portion 142, opposite end portions of the recessed portion 136a in the width direction form upper convex portions 144 and 144 protruding upward relative to the recessed portion 136a.

The left lower member 150 has a basic configuration in which the left upper member 130 is inverted upside down, and includes an outer wall 152 and an inner wall 154 that are opposite to each other in the width direction and extend in the front-rear direction, and a bottom wall 156 that connects the outer wall 152 and the inner wall 154. The left lower member 150 further includes, at a front portion 162 of the bottom wall 156, the recessed portion 156a that is recessed upward at the middle portion of the bottom wall 156 in the width direction. The left lower member 150 also includes a rear notched portion 168 that is notched into a substantially arc shape at the rear end portion of the bottom wall 156. In the front portion 162, opposite end portions of the recessed portion 156a in the width direction form lower convex portions 164 and 164 protruding downward relative to the recessed portion 156a.

The left upper member 130 and the left lower member 150 are joined together into one piece by welding the outer wall 132 and the inner wall 134 correspondingly to the outer wall 152 and the inner wall 154 typically by arc welding, and thus form the left side member 120 having a closed cross-sectional shape. The left upper member 130 and the left lower member 150 may have different plate thicknesses.

At the front portion 142 of the left upper member 130, and at the front portion 162 of the left lower member 150, the respective front end portions of the recessed portions 136a and 156a, and the respective front end portions of the outer wall 152 and the inner wall 154 are welded to mainly the rear-side outer surface of the circumferential wall 12 of the front crossmember 10, while being brought into contact with this rear-side outer surface, so that the front crossmember 10 and the left side member 120 are joined together into one piece. Each of the front ends of the upper convex portions 144 and the lower convex portions 164 is located apart from the outer surface of the circumferential wall 12 of the front crossmember 10 with a gap, while not being in contact with this outer surface. The inner space of the left side member 120 thus communicates with the exterior through the gap. With this configuration, it is possible to ensure a greater contact length between each of the front end portions of the recessed portions 136a and 156a and mainly the rear-side outer surface of the circumferential wall 12 of the front crossmember 10, and between each of the front end portions of the outer wall 152 and the inner wall 154 and mainly the rear-side outer surface of the circumferential wall 12, and it is therefore possible to ensure a greater welding length of the front crossmember 10 and the left side member 120. In addition, this configuration helps coating to enter the left side member 120 through the gap between the front end of the upper convex portions 144 and the outer surface of the circumferential wall 12 of the front crossmember 10, and the gap between the front end of the lower convex portions 164 and the outer surface of the circumferential wall 12. This makes it possible to ensure optimum throwing power of the coating on the left side member 120.

The rear notched portions 148 and 168 are positioned opposite to each other in the vertical direction at the rear end portions of the left upper member 130 and the left lower member 150. The collar member 310 is disposed in such a manner that its end portions in the vertical direction protrude correspondingly from the top wall 136 and the bottom wall 156, and is fixed to the rear notched portions 148 and 168 typically by arc welding.

Relative to the configuration related to the left side member 120, the configuration related to the right side member 220 is laterally symmetrical with respect to the plane parallel to the y-z plane and passing along the center line extending in the front-rear direction at the center of the vehicle body in the width direction. Accordingly, the detailed descriptions of this configuration are omitted. A right upper member 230, an outer wall 232, an inner wall 234, a top wall 236, the recessed portion 236a, a front portion 242, upper convex portions 244, a right extending portion 246, a rear notched portion 248, a right lower member 250, an outer wall 252, an inner wall 254, a bottom wall 256, the recessed portion 256a, a front portion 262, lower convex portions 264, a right extending portion 266, and a rear notched portion 268 are provided corresponding to the left upper member 130, the outer wall 132, the inner wall 134, the top wall 136, the recessed portion 136a, the front portion 142, the upper convex portions 144, the left extending portion 146, the rear notched portion 148, the left lower member 150, the outer wall 152, the inner wall 154, the bottom wall 156, the recessed portion 156a, the front portion 162, the lower convex portions 164, the left extending portion 166, and the rear notched portion 168, respectively.

In the configuration described above, the subframe 1 includes a first opening portion, a second opening portion, a third opening portion, a fourth opening portion, a fifth opening portion, and a sixth opening portion, through each of which the interior of each component that makes up the subframe 1 is open to the exterior. Specifically, the first opening portion is a section of the lower member 30 between the left-front through hole 46 and the left-rear through hole 56 with the interior of this section being open to the exterior. The second opening portion is a section of the lower member 30 between the right-front through hole 48 and the right-rear through hole 58 with the interior of this section being open to the exterior. The third opening portion is a section of the rear crossmember 100 between the left-front through hole 103 and the left-rear through hole 104 with the interior of this section being open to the exterior. The fourth opening portion is a section of the rear crossmember 100 between the right-front through hole 107 and the right-rear through hole 108 with the interior of this section being open to the exterior. The fifth opening portion is a section of the left support member 80 between the left-front through hole 88 and the left-rear through hole 89 with the interior of this section being open to the exterior. The sixth opening portion is a section of the right support member 90 between the right-front through hole 98 and the right-rear through hole 99 with the interior of this section being open to the exterior.

A first support portion S1 on the left-front lower side, a second support portion S2 on the right-front lower side, a third support portion S3 on the left-rear lower side, a fourth support portion S4 on the right-rear lower side, a fifth support portion S5 on the left-front upper side, and a sixth support portion S6 on the right-front upper side are set corresponding to the first opening portion, the second opening portion, the third opening portion, the fourth opening portion, the fifth opening portion, and the sixth opening portion, respectively.

Specifically, in the first support portion S1 located corresponding to the first opening portion, a right pivot of the suspension arm is fastened and attached by a fastening member such as a fastening bolt (all of which are not illustrated) through the left-front through hole 46, the left-rear through hole 56, and the nut member 320 that are provided on the lower member 30.

In the second support portion S2 located corresponding to the second opening portion, a left pivot of the suspension arm is fastened and attached by a fastening member such as a fastening bolt (all of which are not illustrated) through the right-front through hole 48, the right-rear through hole 58, and the nut member 320 that are provided on the lower member 30.

In the third support portion S3 located corresponding to the third opening portion, a right pivot of the suspension arm is fastened and attached by a fastening member such as a fastening bolt (all of which are not illustrated) through the left-front through hole 103, the left-rear through hole 104, and the guide member (not illustrated) that are provided on the rear crossmember 100.

In the fourth support portion S4 located corresponding to the fourth opening portion, a left pivot of the suspension arm is fastened and attached by a fastening member such as a fastening bolt (all of which are not illustrated) through the right-front through hole 107, the right-rear through hole 108, and the guide member (not illustrated) that are provided on the rear crossmember 100.

In the fifth support portion S5 located corresponding to the fifth opening portion, a right pivot of the suspension arm is fastened and attached by a fastening member such as a fastening bolt (all of which are not illustrated) through the left-front through hole 88, the left-rear through hole 89, and the nut member 320 that are provided on the left support member 80.

In the sixth support portion S6 located corresponding to the sixth opening portion, a left pivot of the suspension arm is fastened and attached by a fastening member such as a fastening bolt (all of which are not illustrated) through the right-front through hole 98, the right-rear through hole 99, and the nut member 320 that are provided on the right support member 90.

These left and right pivots are suspension pivots positioned on the inner side in the width direction relative to and correspondingly opposite to left and right pivots (not illustrated). These left and right pivots define the positions of left and right rear wheels (not illustrated) correspondingly in their longitudinal direction and width direction, and also apply a relatively large external force to the subframe mainly in the width direction. The typical configuration of the left and right pivots includes an insulator bush member having a configuration in which a rubber portion is bonded to the collar member through which the fastening member of the pivot is inserted, and having a smaller spring constant in the front-rear direction and a larger spring constant in the width direction. A predetermined pair of the left and right pivots described above may be applied with a spring reaction force of a suspension spring (not illustrated).

In addition, in the subframe 1, a first mounting portion A1 on the left-front side, a second mounting portion A2 on the left-rear side, a third mounting portion A3 on the right-front side, and a fourth mounting portion A4 on the right-rear side are set correspondingly.

Specifically, the first mounting portion A1 is located corresponding to the collar member 310 in the left notched portion 24 of the left extending portion 22 of the front crossmember 10. In the first mounting portion A1, the left extending portion 22 is fastened to a left rear side frame with a fastening member such as a fastening bolt (all of which are not illustrated) and thus attached to the vehicle body side through a subframe mount member (not illustrated) attached to the collar member 310.

The third mounting portion A3 is located corresponding to the collar member 310 in the right notched portion 28 of the right extending portion 26 of the front crossmember 10. In the third mounting portion A3, the right extending portion 26 is fastened to a right rear side frame with a fastening member such as a fastening bolt (all of which are not illustrated) and thus attached to the vehicle body side through the subframe mount member (not illustrated) attached to the collar member 310.

The second mounting portion A2 is located corresponding to the collar member 310 in the rear notched portions 148 and 168 of the left extending portions 146 and 166 of the left side member 120. In the second mounting portion A2, the left extending portions 146 and 166 are fastened to the left rear side frame with a fastening member such as a fastening bolt (all of which are not illustrated) and thus attached to the vehicle body side through the subframe mount member (not illustrated) attached to the collar member 310.

The fourth mounting portion A4 is located corresponding to the collar member 310 in the rear notched portions 248 and 268 of the right extending portions 246 and 266 of the right side member 220. In the fourth mounting portion A4, the right extending portions 246 and 266 are fastened to the right rear side frame with a fastening member such as a fastening bolt (all of which are not illustrated) and thus attached to the vehicle body side through the subframe mount member (not illustrated) attached to the collar member 310.

The typical configuration of the subframe mount member includes an insulator bush member having a configuration in which a rubber portion is bonded to the collar member through which the fastening member of the subframe mount member is inserted, and having a smaller spring constant in the vertical direction and a larger spring constant in the width direction.

In the configuration of the present embodiment described above, the lower member 30 includes the outer-side portion 60, 70, the middle portion 62, 72, and the inner-side portion 65, 75 in the order from the outer side toward the inner side in the width direction, the outer-side portion 60, 70 being provided with a lower support portion that supports a suspension member of a vehicle, the middle portion 62, 72 connecting to the outer-side portion 60, 70, the inner-side portion 65, 75 connecting to the middle portion 62, 72. The middle portion 62, 72 includes the outer-side curved bottom portion 63, 73 and the inner-side curved bottom portion 64, 74, the outer-side curved bottom portion 63, 73 connecting to the bottom portion 61, 71 of the outer-side portion 60, 70 and showing a path extending upward from the bottom portion 61, 71 of the outer-side portion 60, 70 toward the inner side, while being curved without extending downward, the inner-side curved bottom portion 64, 74 connecting to the bottom portion 66, 76 of the inner-side portion 65, 75 and showing a path extending downward from the bottom portion 66, 76 of the inner-side portion 65, 75 toward the outer side, while being curved without extending upward. The first crossmember 10 has the first closed cross-section SE1 in cross-section taken along a plane defined by the front-rear direction and the vertical direction. The lower member 30 has the second closed cross-section SE2 in cross-section taken along the plane. Adjacently-positioned closed cross-sections SE1 and SE2 are provided corresponding to at least a portion of the outer-side curved bottom portion 63, 73 and the inner-side curved bottom portion 64, 74 in the middle portion 62, 72, the adjacently-positioned closed cross-sections SE1 and SE2 being made up of the first closed cross-section SE1 and the second closed cross-section SE2 positioned adjacent to each other in the vertical direction in such a manner as to be divided by the wall portion 12 of the first crossmember 10 and next to each other, the wall portion 12 defining the first closed cross-section SE1. With this configuration, while a necessary strength of the subframe 1 for a vehicle is ensured, the flexibility in setting support stiffness for the suspension member can be improved, so that the strength and the stiffness can be optimized while maintaining a balance between them. Therefore, desired stiffness can be set, and a required strength can be ensured.

In the configuration of the present embodiment, the adjacently-positioned closed cross-sections SE1 and SE2 are always provided corresponding to at least a portion of the inner-side curved bottom portion 64, 74. With this configuration, in a minimum range of adjacently-positioned vertical cross-sections in the width direction, appropriate support stiffness for the suspension member can be set, while a necessary strength of the subframe 1 for a vehicle is ensured.

In the configuration of the present embodiment, the adjacently-positioned closed cross-sections SE1 and SE2 are provided continuously in the width direction across the inner-side curved bottom portion 64, 74 and one or both of the outer-side curved bottom portion 63, 73 and the bottom portion 66, 76 of the inner-side portion 65, 75. With this configuration, stress concentration on the subframe 1 for a vehicle can be reduced to eliminate a particular weak section, so that the strength of the subframe 1 for a vehicle can be further increased.

In the configuration of the present embodiment, the upper support member 80, 90 is provided in such a manner as to be joined to the first crossmember 10, the upper support member 80, 90 being opposite to the lower member 30 on the upper side in the vertical direction with the first crossmember 10 interposed therebetween, the upper support member 80, 90 including the upper-side support portion that supports the suspension member of the vehicle. The upper support member 80, 90 is joined to the inclined surface portion 14 that is inclined by recessing a portion of the cylindrical wall 12 of the first crossmember 10. With this configuration, the upper support member 80, 90 and the inclined surface portion 14 can be joined to each other in a state in which the upper support member 80, 90 is brought into close contact with the inclined surface portion 14, so that this can reduce the likelihood of occurrence of separation fracture in the joined portion.

In the configuration of the present embodiment, each of a pair of the side members 120 and 220 includes a pair of the side walls 132 and 134, 232 and 234, the top wall 136, 236, and the bottom wall 156, 256, the pair of the side walls 132 and 134, 232 and 234 being opposite to each other in the width direction, the top wall 136, 236 connecting upper-side end portions of the pair of the side walls 132 and 134, 232 and 234 in the vertical direction, the bottom wall 156, 256 being opposite to the top wall 136, 236 on the lower side and connecting lower-side end portions of the pair of the side walls 132 and 134, 232 and 234 in the vertical direction. The top wall 136, 236 includes the recessed portion 136a, 236a and a pair of convex-shaped portions 144, 244 in the front-side portion 142, 242 of the top wall 136, 236 in the front-rear direction, the recessed portion 136a, 236a being recessed toward the lower side at a middle portion of the top wall 136, 236 in the width direction, the pair of convex-shaped portions 144, 244 protruding toward the upper side relative to the recessed portion 136a, 236a at opposite end portions of the top wall 136, 236 in the width direction. On the top wall 136, 236, a front end portion of the recessed portion 136a, 236a is joined to the first crossmember 10. The bottom wall 156, 256 includes a recessed portion 156a, 256a and a pair of convex-shaped portions 164, 264 in the front-side portion 162, 262 of the bottom wall 156, 256, the recessed portion 156a, 256a being recessed toward the upper side at a middle portion of the bottom wall 156, 256 in the width direction, the pair of convex-shaped portions 164, 264 protruding toward the lower side relative to the recessed portion 156a, 256a at opposite end portions of the bottom wall 156, 256 in the width direction. On the bottom wall 156, 256, a front end portion of the recessed portion 156a, 256a is joined to the first crossmember 10. With this configuration, while the throwing power of coating on the pair of side members 120 and 220 is improved, their adequate welding length can be ensured to increase the welding strength.

In the present embodiment, various types of nut members, collar members, and guide members are typically made of metal such as steel.

In the present embodiment, the suspension arm may be any suspension arm other than the ones exemplified in the present embodiment as long as it has identical functions.

In the present embodiment, it is allowable that the subframe 1 is mounted on a vehicle body in a rigid form instead of that in a so-called floating form.

In the present invention, the types, shapes, arrangements, numbers, and the like of the constituent members are not limited to those in the above embodiment, and it is needless to mention that the constituent elements can be modified as appropriate without departing from the scope of the invention, such as appropriately replacing these constituent elements with other members having equivalent operational effects.

As described above, in the present invention, it is possible to provide a subframe for a vehicle in which the subframe has a configuration to improve the flexibility in setting stiffness, and thus can ensure a necessary strength, while setting appropriate stiffness by optimizing the strength and the stiffness along with maintaining a balance between them, and because of its general purposes and universal characteristics, applications of the present invention can be expected in a wide range in the field of a subframe for a mobile body such as a vehicle.

What is claimed is:

1. A subframe for a vehicle, the subframe comprising:
a first crossmember that is cylindrical and extends in a width direction of the vehicle;
a second crossmember that is opposite to the first crossmember in a front-rear direction of the vehicle, and extends in the width direction;
a pair of side members opposite to each other in the width direction, each of which extends in the front-rear direction and is joined to the first crossmember and the second crossmember; and
a lower member that extends in the width direction on a lower side of the first crossmember in a vertical direction of the vehicle, and is joined to the first crossmember,
wherein the lower member includes an outer-side portion, a middle portion, and an inner-side portion in order from an outer side toward an inner side in the width direction, the outer-side portion being provided with a lower support portion that supports a suspension member of the vehicle, the middle portion connecting to the outer-side portion, the inner-side portion connecting to the middle portion,
the middle portion includes an outer-side curved bottom portion and an inner-side curved bottom portion, the outer-side curved bottom portion connecting to a bottom portion of the outer-side portion and showing a path extending upward from the bottom portion of the outer-side portion toward the inner side, while being curved without extending downward, the inner-side curved bottom portion connecting to a bottom portion of the inner-side portion and showing a path extending downward from the bottom portion of the inner-side portion toward the outer side, while being curved without extending upward,
the first crossmember has a first closed cross-section in cross-section taken along a plane defined by the front-rear direction and the vertical direction,
the lower member has a second closed cross-section in cross-section taken along the plane,
the first crossmember and the lower member are disposed to extend on a front side in the front-rear direction with respect to the pair of side members, and
adjacently-positioned closed cross-sections are provided to cross between the bottom portion of the outer-side portion and the bottom portion of the inner-side portion with the outer-side curved bottom portion and the inner-side curved bottom portion in the middle portion intervening therebetween, the adjacently-positioned closed cross-sections being made up of the first closed cross-section and the second closed cross-section positioned adjacent to each other in the vertical direction in such a manner as to be divided by a wall portion of the first crossmember and next to each other, the wall portion defining the first closed cross-section,
wherein
each of the pair of side members includes a pair of side walls, a top wall, and a bottom wall, the pair of side walls being opposite to each other in the width direction, the top wall connecting upper-side end portions of the pair of side walls in the vertical direction, the bottom wall being opposite to the top wall on the lower side and connecting lower-side end portions of the pair of side walls in the vertical direction,
the top wall includes a recessed portion and a pair of convex-shaped portions in a front-side portion of the top wall in the front-rear direction, the recessed portion being recessed toward the lower side at a middle portion of the top wall in the width direction, the pair of convex-shaped portions protruding toward the upper side relative to the recessed portion at opposite end portions of the top wall in the width direction,
on the top wall, a front end portion of the recessed portion is joined to the first crossmember,
the bottom wall includes a recessed portion and a pair of convex-shaped portions in the front-side portion of the bottom wall, the recessed portion being recessed toward the upper side at a middle portion of the bottom wall in the width direction, the pair of convex-shaped portions protruding toward the lower side relative to the recessed portion at opposite end portions of the bottom wall in the width direction, and
on the bottom wall, a front end portion of the recessed portion is joined to the first crossmember.

2. A subframe for a vehicle, the subframe comprising:
a first crossmember that is cylindrical and extends in a width direction of the vehicle;
a second crossmember that is opposite to the first crossmember in a front-rear direction of the vehicle, and extends in the width direction;
a pair of side members opposite to each other in the width direction, each of which extends in the front-rear direction and is joined to the first crossmember and the second crossmember; and
a lower member that extends in the width direction on a lower side of the first crossmember in a vertical direction of the vehicle, and is joined to the first crossmember,
wherein the lower member includes an outer-side portion, a middle portion, and an inner-side portion in order from an outer side toward an inner side in the width direction, the outer-side portion being provided with a lower support portion that supports a suspension member of the vehicle, the middle portion connecting to the outer-side portion, the inner-side portion connecting to the middle portion,
the middle portion includes an outer-side curved bottom portion and an inner-side curved bottom portion, the outer-side curved bottom portion connecting to a bottom portion of the outer-side portion and showing a path extending upward from the bottom portion of the outer-side portion toward the inner side, while being curved without extending downward, the inner-side curved bottom portion connecting to a bottom portion of the inner-side portion and showing a path extending downward from the bottom portion of the inner-side portion toward the outer side, while being curved without extending upward,
the first crossmember has a first closed cross-section in cross-section taken along a plane defined by the front-rear direction and the vertical direction,
the lower member has a second closed cross-section in cross-section taken along the plane, and
adjacently-positioned closed cross-sections are provided corresponding to at least a portion of the outer-side curved bottom portion and the inner-side curved bottom portion in the middle portion, the adjacently-positioned closed cross-sections being made up of the first closed cross-section and the second closed cross-section positioned adjacent to each other in the vertical direction in such a manner as to be divided by a wall portion of the first crossmember and next to each other, the wall portion defining the first closed cross-section wherein each of the pair of side members includes a pair of side walls, a top wall, and a bottom wall, the pair of side walls being opposite to each other in the width direction, the top wall connecting upper-side end portions of the pair of side walls in the vertical direction, the bottom wall being opposite to the top wall on the lower side and connecting lower-side end portions of the pair of side walls in the vertical direction, the top wall includes a recessed portion and a pair of convex-shaped portions in a front-side portion of the top wall in the front-rear direction, the recessed portion being recessed toward the lower side at a middle portion of the top wall in the width direction, the pair of convex-shaped portions protruding toward the upper side relative to the recessed portion at opposite end portions of the top wall in the width direction, on the top wall, a front end portion of the recessed portion is joined to the first crossmember, the bottom wall includes a recessed portion and a pair of convex-shaped portions in the front-side portion of the bottom wall, the recessed portion being recessed toward the upper side at a middle portion of the bottom wall in the width direction, the pair of convex-shaped portions protruding toward the lower side relative to the recessed portion at opposite end portions of the bottom wall in the width direction, and on the bottom wall, a front end portion of the recessed portion is joined to the first crossmember.

3. The subframe for a vehicle according to claim 2, wherein an upper support member is provided in such a manner as to be joined to the first crossmember, the upper support member being opposite to the lower member on an upper side in the vertical direction with the first crossmember interposed therebetween, the upper support member including an upper-side support portion that supports a suspension member of the vehicle, the upper support member being joined to an inclined surface portion that is inclined by recessing a portion of a cylindrical wall of the first crossmember.

* * * * *